United States Patent [19]

Sasaki et al.

[11] Patent Number: 5,326,821

[45] Date of Patent: Jul. 5, 1994

[54] RESIN COMPOSITION FOR POWDER COATINGS

[75] Inventors: Shingo Sasaki, Aichi; Kazuyuki Wakamura, Kyoto; Taisaku Kano; Takayoshi Sekido, both of Kanagawa, all of Japan

[73] Assignees: Unitika Ltd., Hyogo; Mitsui Toatsu Chemicals, Inc., Tokyo, both of Japan

[21] Appl. No.: 972,090

[22] Filed: Nov. 5, 1992

Related U.S. Application Data

[63] Continuation of Ser. No. 925,893, Aug. 7, 1992, abandoned, which is a continuation of Ser. No. 663,064, Mar. 1, 1991, abandoned, which is a continuation of Ser. No. 263,229, Oct. 27, 1988, abandoned.

[30] Foreign Application Priority Data

Oct. 28, 1987 [JP] Japan .................. 62-272047

[51] Int. Cl.$^5$ .................. C08L 67/02; C08L 33/14
[52] U.S. Cl. .................. 525/124; 525/176; 525/183
[58] Field of Search .................. 525/124, 176, 183

[56] References Cited

U.S. PATENT DOCUMENTS

| | | | |
|---|---|---|---|
| 3,781,380 | 12/1973 | Labana et al. | 525/208 |
| 4,073,775 | 2/1978 | Matsuo et al. | 525/124 |
| 4,299,931 | 11/1981 | Coran et al. | 525/191 |
| 4,818,791 | 4/1989 | Murakami et al. | 525/124 |

FOREIGN PATENT DOCUMENTS

| | | | |
|---|---|---|---|
| 3213160 | 10/1983 | Fed. Rep. of Germany . | |
| 48-38618 | 1/1973 | Japan . | |
| 54-36339 | 3/1979 | Japan | 525/124 |
| 55-1945 | 1/1980 | Japan . | |
| 56-51169 | 3/1981 | Japan . | |
| 59-6267 | 1/1984 | Japan . | |
| 60-120764 | 6/1985 | Japan | 525/124 |
| 3-17165 | 1/1991 | Japan | 525/124 |
| 9201756 | 2/1992 | World Int. Prop. O. | 525/124 |

OTHER PUBLICATIONS

Patent Abstracts of Japan, vol. 12, No. 117 (C-487) [2964], Apr. 13, 1988.
Patent Abstracts of Japan, vol. 11, No. 85 (C-410) [2532], Mar. 14, 1987.

*Primary Examiner*—Vasu S. Jagannathan
*Attorney, Agent, or Firm*—Sughrue, Mion, Zinn, Macpeak & Seas

[57] ABSTRACT

A resin composition for powder coatings that comprises a composition (A) and a blocked polyisocyanate compound (B), the composition (A) being based on both a carboxyl group containing polyester resin having a hydroxyl value of 10 to 100 and a softening point of 50° to 150° C. and a glycidyl group containing acrylic resin having a hydroxyl value of 30 to 150 and a softening point of 50° to 150° C., and further containing a copolymer prepared by reaction between said polyester and acrylic resins. This resin composition is capable of providing an ideal paint film that possesses the features of a paint film prepared from polyester resins (high degrees of smoothness, gloss and strength) and those of a paint film prepared from acrylic resins (high levels of hardness, stain resistance and weatherability).

13 Claims, 1 Drawing Sheet x 10,000

RESIN COMPOSITION FOR POWDER COATINGS

This is a continuation of application Ser. No. 07/925,893 filed Aug. 7, 1992 abandoned, which is a continuation of application Ser. No. 07/663,064, filed on Mar. 1, 1991, abandoned, which is a continuation of application Ser. No. 07/263,229, filed on Oct. 27, 1988 abandoned.

FIELD OF THE INVENTION

The present invention relates to a resin composition for powder coatings. More particularly, the present invention relates to a resin composition for powder coatings containing a polyester resin, an acrylic resin, a copolymer of the polyester and acrylic resins, and a blocked polyisocyanate compound.

BACKGROUND OF THE INVENTION

In order to ensure that paints coated on metal surfaces will exhibit their two principal functions, i.e., protection and decoration, for a prolonged period of time, it is often required to provide paint films in at least two layers. Heretofore, to meet this need, resins having improved adhesion and corrosion resistance have been used in primers, and resins having improved weatherability, stain resistance and hardness have been used in topcoats.

As for application techniques, there has been a shift to the two-coat, one-bake process from the two-coat, two-bake process. From the viewpoint of energy saving, the one-coat, one-bake process should ultimately be an ideal method.

Because of their high performance and low cost, demands for powder coatings have constantly been growing. On the other hand, powder coatings are applied in single layers which perform single functions, so there inevitably is a limit to the future growth of demands for powder coatings although their use is growing in applications that suit the specific performance of individual types of coatings.

Under these circumstances, active efforts are being made to study a resin composition of the polyesteracrylic hybrid type for powder coatings that possess both the features of a powder coating resin composition made of a polyester resin and the features of a powder coating resin composition made of an acrylic resin (JP-B-55-1945) (the term "JP-B" as used herein refers to an "examined Japanese patent publication"). With a view to improving the stain resistance and solvent resistance of blocked isocyanate cured polyester powder coatings, a composition characterized by a blend with an acrylic resin having at least one of a hydroxyl group and a glycidyl group has been proposed (JP-A-59-6267) (the term "JP-A" as used herein refers to a "published unexamined Japanese patent application").

Most of the conventional resin compositions of the polyester-acrylic hybrid type for powder coatings are characterized by merely blending polyester and acrylic resins. When polyester and acrylic resins that are not highly miscible with each other are blended, smooth coating surfaces are not attainable. On the other hand, polyester and acrylic resins that are highly miscible with each other are only capable of forming paint films that display a performance intermediate between those of the respective resins even in the most favorable case.

SUMMARY OF THE INVENTION

The principal object, therefore, of the present invention is to provide a resin composition for powder coatings that is capable of producing an ideal paint film that possesses the features of a paint film prepared from polyester resins (i.e., a single application is sufficient to produce a smooth, glossy and strong film) and those of a paint film prepared from acrylic resins (i.e., high levels of hardness, stain resistance and weatherability).

Under the background described above, the present inventors conducted intensive studies in order to provide a polyester-acrylic hybrid type powder coating resin composition that is free from the problems associated with the conventional products. As a result, the present inventors found that the above-stated object of the present invention could be attained by a resin composition containing a copolymer prepared by reacting a specified polyester resin and a specified acrylic resin. The present invention has been accomplished on the basis of this finding.

The present invention, in essence, relates to a resin composition for powder coatings which comprises:

(1) a composition (A) comprising a polyester resin (A1) having an average of about 0.1 to 1.0 carboxyl group in one molecule and which has a hydroxyl value of about 10 to 100 and a softening point of about 50° to 150° C., an acrylic resin (A2) having an average of about 0.1 to 4 glycidyl groups in one molecule and which has a hydroxyl value of about 30 to 150 and a softening point of about 50° to 150° C., and a copolymer (CP) prepared by reaction between the polyester resin (A1) and the acrylic resin (A2); and (2) a blocked polyisocyanate compound (B) in an amount of about 5 to 50 parts by weight per 100 parts by weight of the composition (A).

DETAILED DESCRIPTION OF THE INVENTION

Figure 1:
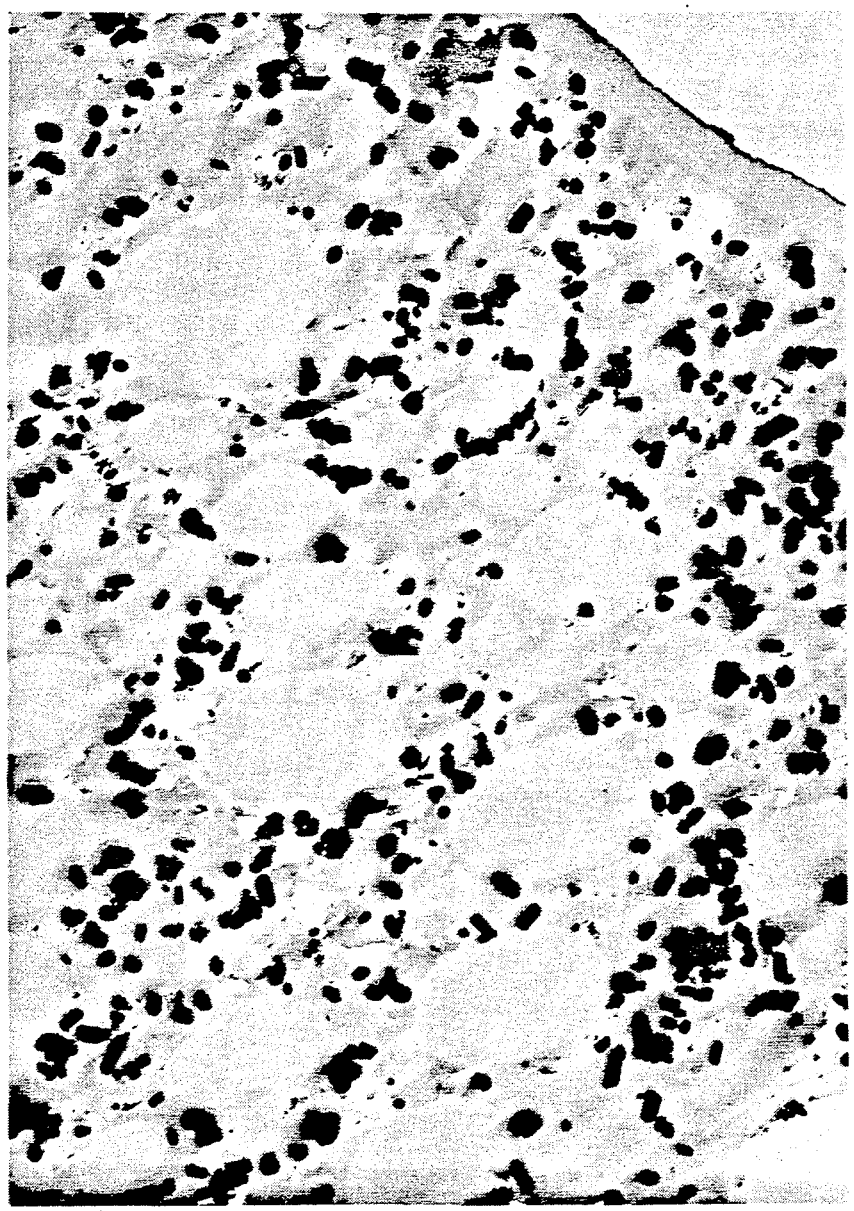
FIG. 1 is a transmission electron microscope (TEM) photograph ($\times 10,000$) showing an example of the cross section of the paint film stained with osmic acid prepared from a powder coating composed of the powder coating resin composition of the present invention.

Polyester resin (A1) which is one component of the composition (A) in the resin composition of the present invention has an average of about 0.1 to 1.0, preferably 0.15 to 0.6, carboxyl group in one molecule, and has a hydroxyl value of about 10 to 100, preferably 20 to 50, and a softening point of 50° to 150° C., preferably 90° to 140° C. If the polyester resin (A1) contains less than 0.1 carboxyl group on average in one molecule, it will not fully react with the acrylic resin (A2). If more than 1.0 carboxyl is present, the resulting copolymer will have an excessively high molecular weight and the smoothness of a paint film is impaired. Further, gellation might occur in the process of reaction between the polyester and acrylic resins. If the hydroxyl value of polyester resin (A1) is less than 10, desired cross-linking effects will not be attained and only a weak paint film will result. If the hydroxyl value of polyester resin (A1) exceeds 100, the curing reaction proceeds so fast that a smooth and glossy paint film will not be obtained. In addition, the flexibility of the paint film is impaired. If the softening point of polyester resin (A1) is below 50°

C., a powder coating having good storage stability is not attainable. If the softening point of polyester resin (A1) exceeds 150° C., the flowability of a coating becomes too low to produce a smooth paint film.

The polyester resin described above is a hydroxyl-rich polyester having a predetermined amount of carboxyl groups at terminals and may be prepared by, for example, a method involving the addition of an acid anhydride to part of the hydroxyl groups in a hydroxyl group containing polyester resin, or a method in which the conversion ratio is controlled in producing a polyester resin by a polycondensation reaction.

Such a polyester resin can be produced by various methods as described, for example, in JP-B-56-51169.

Carboxylic acid components that can be used in the preparation of such a polyester resin include, for example: polyvalent carboxylic acids such as terephthalic acid, isophthalic acid, phthalic acid, naphthalenedicarboxylic acid, succinic acid, glutaric acid, adipic acid, pimelic acid, suberic acid, azelaic acid, sebacic acid, 1,9-nonanedicarboxylic acid, 1,10-decanedicarboxylic acid, 1,12-dodecanedicarboxylic acid, 1,2-dodecanedicarboxylic acid, 1,2-octadecanedicarboxylic acid, eicosanedicarboxylic acid, maleic acid, fumaric acid, cyclohexanedicarboxylic acid, hexahydrophthalic acid, tetrahydrophthalic acid, trimellitic acid and pyromellitic acid; lower alkyl esters and anhydrides thereof; and hydroxycarboxylic acids such as malic acid, tartaric acid, 12-hydroxystearic acid and paraoxybenzoic acid. Useful alcoholic components include, for example, ethylene glycol, diethylene glycol, triethylene glycol, 1,2-propanediol, 1,3-propanediol, 1,3-butanediol, 1,4-butanediol, 1,5-pentanediol, 1,6-hexanediol, 1,9-nonanediol, 1,10-decanediol, neopentyl glycol, spiroglycol, 1,4-cyclohexanedimethanol, 2,2,4-trimethylpentane-1,3-diol, trimethylolethane, trimethylolpropane, glycerin, pentaerythritol, hydrogenated bisphenol A, ethylene oxide adduct of hydrogenated bisphenol A, and propylene oxide adduct of the same.

Acrylic resin (A2) which is another component of the composition (A) in the resin composition of the present invention has an average of about 0.1 to 4, preferably 0.3 to 2, glycidyl groups in one molecule, and has a hydroxyl value of about 30 to 150, preferably 50 to 120, and a softening point of about 50° to 150° C. preferably 90° to 140° C. If the acrylic resin (A2) contains less than 0.1 glycidyl group on average in one molecule, it will not fully react with the polyester resin (A1). If more than 4 glycidyl groups are present, not only is the smoothness of a paint film impaired but also gellation might occur in the process of reaction between the polyester and acrylic resins. If the hydroxyl value of acrylic resin (A2) is less than 30, desired crosslinking effects will not be attained and only a weak paint film will result. If the hydroxyl value of acrylic resin (A2) exceeds 150, the curing reaction proceeds so fast that a smooth and glossy paint film will not be obtained. If the softening point of acrylic resin (A2) is below 50° C., a powder coating having good storage stability is not attainable. If the softening point of acrylic resin (A2) exceeds 150° C., the flowability of a coating becomes too low to produce a smooth paint film.

Such an acrylic resin has a predetermined amount of glycidyl groups and can be prepared by a known polymerization method such as solution polymerization, suspension polymerization or bulk polymerization using one or more hydroxyl group-containing monomers, one or more glycidyl group-containing monomers, and one or more other comonomers.

Such an acrylic resin can usually be produced by various methods such as the one described in JP-B-48-38618.

Hydroxyl group-containing monomers that can be used in the preparation of the acrylic resin (A2) include, for example, hydroxyethyl acrylate, hydroxyethyl methacrylate, hydroxypropyl acrylate, hydroxypropyl methacrylate, hydroxybutyl acrylate, hydroxybutyl methacrylate, 2-hydroxy-2-phenylethyl acrylate, 2-hydroxy-2-phenylethyl methacrylate, and allyl alcohol.

Illustrative glycidyl group-containing monomers that can be used include glycidyl acrylate, glycidyl methacrylate, α-methylglycidyl acrylate, α-methylglycidyl methacrylate, β-methylglycidyl acrylate and β-methylglycidyl methacrylate.

Other comonomers that can be used include acrylic acid, methacrylic acid, and acrylate or methacrylate esters such as methyl acrylate, methyl methacrylate, ethyl acrylate, ethyl methacrylate, n-propyl acrylate, n-propyl methacrylate, isopropyl acrylate, isopropyl methacrylate, n-butyl acrylate, n-butyl methacrylate, isobutyl acrylate, isobutyl methacrylate, tert-butyl acrylate, tert-butyl methacrylate, 2-ethylhexyl acrylate, 2-ethylhexyl methacrylate, octyl acrylate, octyl methacrylate, dodecyl acrylate, dodecyl methacrylate, benzyl acrylate, benzyl methacrylate, dimethylaminoethyl acrylate, dimethylaminoethyl methacrylate, diethylaminoethyl acrylate, and diethylaminoethyl methacrylate. Other examples of comonomers include fumaric acid dialkyl esters, itaconic acid dialkyl esters, styrene, vinyl toluene, α-methylstyrene, acrylonitrile, methacrylonitrile, acrylamide, methacrylamide, methylol acrylamide, methylol methacrylamide, vinyl oxazoline, vinyl acetate, vinyl propionate, lauryl vinyl ether, halogen-containing vinyl monomers, and silicon-containing vinyl monomers.

The composition (A) of the present invention further contains a copolymer (CP) which is obtained by reaction between the above-described polyester and acrylic resins.

The amount of the copolymer of polyester and acrylic resins to be incorporated in the composition (A) may vary with such factors as the weight ratio of the two resins and the distribution of carboxyl groups in the polyester resin and glycidyl groups in the acrylic resin. Usually, the copolymer is preferably contained in an amount of 0.5 to 20 wt % of composition (A), with the range of 2 to 10 wt % of composition (A) being particularly preferred. Therefore, if the content of glycidyl groups in the acrylic resin is low or if the proportion of the acrylic resin occupied in composition (A) is small, the percent conversion of glycidyl groups has to be increased. If, on the other hand, the content of glycidyl groups is high or if the proportion of the acrylic resin is large, the percent conversion of glycidyl groups has to be decreased so that the amount of the copolymer is controlled to be within a certain range. It is particularly to be noted here that if more than one glycidyl group on average is contained in one molecule of the acrylic resin, the percent conversion of glycidyl groups must be controlled in such a way that no more than one glycidyl group on average will remain in one molecule of the acrylic resin to become available for the reaction.

The copolymer of the polyester and acrylic resins present in the composition (A) is difficult to isolate. Therefore, the amount of such a copolymer is calculated from the percent conversion of glycidyl groups, subject to the assumption that glycidyl groups in the acrylic resin taking part in the formation of the copolymer are distributed uniformly among all molecules of the acrylic resin. For the purposes of the present invention, the amount of the copolymer thus calculated is used as a guide.

Composition (A) may be prepared by the following procedures. The polyester and acrylic resins are mixed in weight proportions which preferably range from about 10/90 to 90/10, more preferably from 30/70 to 70/30; the two resins are melted; the carboxyl groups in the polyester resin and the glycidyl groups in the acrylic resin are allowed to react selectively with stirring in a molten state in a reaction vessel under conditions that enable those carboxyl groups and glycidyl groups to react selectively, for example, at temperatures between about 120° and 180° C. preferably between 140° and 160° C., for periods ranging from about 1 to 100 minutes, preferably from 10 to 60 minutes. The desired composition (A) can also be prepared by allowing the carboxyl groups in the polyester resin to react selectively with the glycidyl groups in the acrylic resin under the same conditions as described above using heated rollers, a kneader or other substitutes for the reaction vessel. In order to accelerate the reaction, catalysts such as metal salts of stearic acid, imidazole and phosphorus compounds may be incorporated in both resins or in either one of these resins.

The copolymer prepared by reacting the carboxyl groups in the polyester resin with the glycidyl groups in the acrylic resin is preferably a block copolymer.

In order for both of the polyester resin (A1) and the acrylic resin (A2) to exhibit their features in an effective way, the ratio of the sum of the polyester resin (A1) and the polyester components of the copolymer (CP) present in the powder coating resin composition of the present invention to the sum of the acrylic resin (A2) and the acrylic components of the copolymer (CP) is preferably within the range of from about 10/90 to 90/10 by weight, more preferably from 30/70 to 70/30 by weight.

The polyester component is polyester unit of the copolymer, and is derived from the polyester resin as starting material. The acrylic component is acrylic unit of the copolymer, and is derived from the acrylic resin as starting material.

Besides being adjusted by controlling the proportions of starting materials used in the production of the copolymer as described above, the proportion of polyester resin (A1) or acrylic resin (A2) to be contained in the composition (A) may be adjusted by first preparing a composition containing the intended copolymer and then adding either polyester resin (A1) or acrylic resin (A2) to said composition. This method has the advantage of readily meeting a specific requirement such as the need to exploit the features of the polyester resin and/or the acrylic resin.

A blocked polyisocyanate compound (B) is used as a curing agent in the present invention.

Any of the isocyanate compounds or prepolymers having an isocyanato group that are masked with a blocking agent may be used as blocked polyisocyanate compounds so long as they are capable of participating in the curing process by reacting with hydroxyl groups present in the composition (A). Stated more specifically, illustrative isocyanate compounds include isophorone diisocyanate, hexamethylene diisocyanate, hydrogenated xylylene diisocyanate, dicyclohexylmethane diisocyanate, and those isocyanate compounds having a urethodione or isocyanuric ring which is a dimer or trimer, respectively, of the compounds listed above. Examples of prepolymers having an isocyanato group are those which are obtained by reacting the isocyanate compounds set forth above with alcoholic compounds such as ethylene glycol, diethylene glycol, trimethylolpropane and pentaerythritol. Illustrative blocking agents include lactams, phenols, alcohols, oximes, maloate esters and acetyl acetone.

Such blocked polyisocyanate compounds may be produced in accordance with the disclosure in "High Polymer", Vol. 16, "Polyurethanes Chemistry and Technology, Part I, Chemistry", Interscience Publishers, 1962, pp. 120–121.

The blocked polyisocyanate compound (B) is used in an amount of about 5 to 50 parts by weight, preferably 10 to 30 parts by weight, per 100 parts by weight of the composition (A). If less than 5 parts by weight of the blocked polyisocyanate compound is used, the composition (A) will not cure satisfactorily and only a weak paint film will result. If more than 50 parts by weight of the blocked polyisocyanate compound is used, the antiblocking properties of the coating produced will decrease.

If the performance of a paint film prepared from the powder coating resin composition of the present invention which consists of the composition (A) and the blocked polyisocyanate compound (B) is additionally required to possess the features of a polyester and/or an acrylic resin, the proportions of the polyester resin and/or acrylic resin which are the components of composition (A) may be adjusted appropriately. As an alternative means, a polyester or an acrylic resin that satisfies the conditions set forth below, or mixtures of these resins may additionally be incorporated. In these cases, the performance of the paint film to be produced, the storage stability of the coating composition and other factors need to be considered in selecting particular polyester and acrylic resins.

Preferred polyester is a polyester resin (C1) that satisfies the conditions for a hydroxyl value of about 10 to 100 and a softening point of about 50° to 150° C. and preferred acrylic resin is an acrylic resin (C2) satisfying the conditions for a hydroxyl value of about 30 to 150 and a softening point of about 50° to 150° C. Such a polyester resin (C1) or an acrylic resin (C2) is mixed with the composition (A) to form a composition (C). In this composition (C), it is preferred that the composition (A) ranges from about 5 to 95 parts by weight, and the sum of the polyester resin (C1) and acrylic resin (C2) ranges from about 95 to 5 parts by weight, per 100 parts by weight of composition (C), with the ratio of the sum of the polyester resins (A1) and (C1) and the polyester components of the copolymer (CP) to the sum of the acrylic resins (A2) and (C2) and the acrylic components of the copolymer (CP) ranging from about 90/10 to 10/90 by weight.

The polyester resin (C1) is the same as the polyester resin (A1) with respect to the starting materials to be selected and the conditions for its production. However, in the absence of the need for a reaction to occur between this polyester resin (C1) and the glycidyl groups in the acrylic resin, there is no limit on the range of the quantity of carboxyl groups to be present in the molecule of this polyester resin. Therefore, in adding an acid anhydride to part of the hydroxyl groups in a hydroxyl group containing polyester or in producing a polyester resin by a polycondensation reaction, there is no need to maintain the content of carboxyl groups above a certain level by controlling the degree of the esterification reaction. Except for the absence of the need to use a glycidyl group containing monomer as a starting material, the starting materials to be selected in producing the acrylic resin (C2) are the same as in the case of the acrylic resin (A2). Other conditions for the production of acrylic resin (C2) are also the same as acrylic resin (A2).

In order to produce a paint film that is further improved in surface smoothness and toughness, it is very effective to employ a composition (D) which is composed of the composition (A) or (C) and at least either one of a crystalline aliphatic polyester (D1) and a crystalline long chain aliphatic diol (D2). The crystalline aliphatic polyester (D1) contains a linear aliphatic dicarboxylic acid as acid component in an amount of not less than 80 mol % of all acid and a linear aliphatic diol as diol component in an amount of not less than 80 mol % of all diol, and has a hydroxyl value of 10 to 400 and a melting point of about 50° to 120° C. As other acid component, an aromatic dicarboxylic acid such as terephthalic acid or isophthalic acid may be used in an amount of 20 mol % or less. If its content exceeds 20 mol %, the crystallinity is decreased. As other diol component, a branched diol such as 1,2-propanediol, 1,3-butanediol or neopentyl glycol may be used in an amount of 20 mol % or less. The crystalline long chain aliphatic diol (D2) has a hydroxyl value of about 10 to 400 and a melting point of about 50° to 120° C.

The proportions of the composition (A) or (C) and the aliphatic polyester (D1) or aliphatic diol (D2) are preferably such that the composition (A) or (C) is contained in an amount of about 80 to 99.5 parts by weight and the sum of the aliphatic polyester (D1) and the aliphatic diol (D2) is about 20 to 0.5 parts by weight, more preferably 20 to 1 parts by weight, per 100 parts by weight of the composition (D).

The crystalline aliphatic polyester (D1) is an easily crystallizable polyester that contains as acid component a linear aliphatic dicarboxylic acid having even-numbered carbon atoms such as succinic acid, adipic acid, suberic acid, sebacic acid, 1,10-decanedicarboxylic acid or SL-20 (the trade name of Okamura Seiyu K.K. for a long chain aliphatic dicarboxylic acid) and contains as diol component a linear aliphatic diol having even-numbered carbon atoms such as ethylene glycol, 1,4-butanediol, 1,6-hexanediol, 1,8-octanediol or 1,10-decanediol.

Illustrative crystalline aliphatic polyesters are polyethylene succinate, polyethylene adipate, polyethylene sebacate, poly-1,4-butylene sebacate and poly-1,6-hexylene sebacate, etc.

Illustrative crystalline long chain aliphatic diols (D2) are SL-20-OH (the trade name of Okamura Seiyu K.K. for a long chain aliphatic diol) and olefinic waxes having an average of two hydroxyl groups in one molecule with a number average molecular weight of about 250 to 12,000 and which have a high degree of crystallinity.

Among the above-described crystalline aliphatic polyesters and crystalline aliphatic diols, those which have hydroxyl values of no more than 10 will result in high molecular weights and have a tendency to decrease flowability and, hence, are not suitable for the purpose of further improving the smoothness of paint films. By contrast, those which have low molecular weights with hydroxyl values of 400 and above will retain good flowability but have a tendency to decrease the antiblocking properties of powder coatings.

The crystalline aliphatic polyesters and crystalline aliphatic diols preferably have melting points of about 50° to 120° C., and those which exhibit a sharp melting behavior at 60° to 100° C. are particularly preferred. Those which melt below 50° C. reduce the antiblocking properties of powder coatings. Those melting above 120° C. are not highly effective in improving the smoothness of paint films.

In preparing a paint formulation from the powder coating resin composition of the present invention, various additives may be incorporated, such as epoxy resins for improving corrosion resistance, benzoin for inhibiting the occurrence of cissing in paint films, as well as curing catalysts for promoting the curing reaction, pigments, leveling agents and antistats.

In preparing a powder coating from the resin composition of the present invention, known inorganic or organic pigments may be employed. Preferred examples of inorganic pigments include metal oxides such as titanium dioxide, iron oxide and zinc oxide, and carbon black. Preferred organic pigments are those which will not be detrimental to the antiblocking properties of powder coatings and may be exemplified by α-Naphthol, α-Naphthol blue, Alizarin, Alizarin blue and Alizarin Yellow C. The type and quantity of a specific pigment used should be selected in accordance with the color desired. For example, titanium dioxide is typically used in an amount of about 10 to 50 parts by weight per 100 parts by weight of the powder coating resin composition of the present invention.

The powder coating resin composition of the present invention may be produced by a conventional process comprising dry blending the ingredients set forth above with a Henschel mixer, melt blending the mixture with an extruder, cooling the blend, grinding the cold blend, and classifying the particles.

The powder coating formulated from the resin composition of the present invention can be applied by electrostatic coating or any other standard methods for applying powder coatings. Baking can also be effected by standard procedures.

The mechanism by which a smooth and glossy paint film can be formed from the powder coating resin composition of the present invention would be explained as follows: by virtue of the copolymer, in particular the block copolymer (CP), obtained by reaction between the polyester resin (A1) and the acrylic resin (A2), the miscibility of these two resins is improved by an appropriate degree and, as a result, uniform flow may have occurred across the thickness of a paint film in the initial period (flow stage) of curing. The reason why the paint film prepared from the powder coating resin composition of the present invention is able to exhibit the capabilities of both the polyester and acrylic resins is not completely clear but a plausible explanation would be that an acrylic resin layer has formed on the surface of the paint film whereas a polyester resin layer has formed on the inside of the film. Such a "multilayered structure" in which the polyester and acrylic resins form ideally separated layers would have derived from the relatively low surface free energy of the acrylic resin.

The powder coating resin composition of the present invention is able to provide a powder coating that displays, in combination, the high strength due to good adhesion to steel plates and desired surface properties such as high hardness, stain resistance and weatherability, and which needs only one application to form an ideal paint film which is smooth and glossy.

The resin composition of the present invention is suitable for use as a powder coating to be applied to metallic materials such as steel plates. It is also suitable for application to precoated metals on electric apparatus such as refrigerators and outdoor unit of air conditioners. Another application of this resin composition is for automotive exterior plates.

The various characteristics of the powder coating resin composition of the present invention are measured by the following methods.

Glycidyl Group Content:

5 g of a sample is dissolved in 100 ml of chloroform and the content of glycidyl groups is measured by a tetraethyl ammonium bromide-perchloric acid method.

Hydroxyl Value:

3 g of a sample is dissolved in 50 ml of pyridine; to the solution, 5 ml of a 12 vol % acetic anhydride solution in pyridine is added so as to sequester the hydroxyl groups, and the hydroxyl value is determined by titration of excess acetic anhydride and acetic acid with an alcoholic KOH solution. The unit of the hydroxyl value is KOH mg/g.

Carboxyl Group Content:

500 mg of a sample is dissolved in 50 ml of dioxane and the content of carboxyl groups is determined by direct titration with an alcoholic KOH solution.

Acid Value:

The acid value is determined by KOH mg/g of the above carboxyl group content.

Softening Point:

A sample is ground into fine particles, which are packed in a glass capillary (i.d.: 2.6 mm $\phi$; o.d.: 5 mm $\phi$); the capillary is heated in an oil bath at a rate of 1° C./min and the temperature at which the sample starts to liquefy is read with the naked eye.

The following examples are provided for the purpose of further illustrating the present invention but are by no means taken to be limiting. In the Referential Examples and Examples that follow, all "parts" are "parts by weight".

In the following description, the characteristics of the paint films prepared are those which were evaluated by the following methods.

(1) Smoothness

Evaluated by visual inspection in accordance with the following criteria: ⊙, very smooth; ○, smooth; Δ, somewhat matted; , matted; x, no flow (2) Gloss (60° reflectance in % from a mirror surface)

60° reflectance (%) from a mirror surface was determined in accordance with JIS-K-5400.

(3) Erichsen Distensibility (mm)

Determined in accordance with JIS-K-7777.

(4) Impact Resistance (cm)

Determined with a Du Pont impact tester (dia., ½ inch $\phi$; load, 1 kg) in accordance with JIS-K-5400.

(5) Flexibility

A bending test was conducted at a bending diameter (curvature dia.) of 1 to 3 mm $\phi$ in accordance with JIS-K-5400. The results were evaluated by the following criteria: ○, acceptable; x, not acceptable.

(6) Stain Resistance

A writing felt pen impregnated with oily ink was used to deposit oily ink on a paint film; after standing for 24 hours, the deposit was wiped off with methanol and the residual stain was evaluated with the naked eye in accordance with the following criteria: ⊙, no trace of residual stain; Δ, a small amount of residual stain; , extensive residual stain; x, practically all stain remained.

(7) Weatherability (%)

After exposure to light in a sunshine weatherometer for 500 hours in accordance with JIS-K-5400, 6-16, the percent retention of gloss was determined.

(8) Pencil Hardness

Measured in accordance with JIS-K-5400.

REFERENTIAL EXAMPLE 1

Preparation of Polyester Resin (a)

The starting materials listed below were charged into a reaction vessel and subjected to an esterification reaction at 250° C. for 5 hours. After discharging a stoichiometric amount of water from the reaction system, 0.5 parts of antimony trioxide was added and the reaction was carried out at 270° C. for 5 hours with the pressure controlled at 20 mm Hg, so as to prepare a polyester resin (a) having a hydroxyl value of 36, a softening point of 115° C., an acid value of 1, and a number average molecular weight of 4,200.

This resin had an average of 0.08 carboxyl groups in one molecule.

| | |
|---|---|
| Terephthalic Acid | 1,162 parts |
| Isophthalic Acid | 498 parts |
| Ethylene Glycol | 186 parts |
| Neopentyl Glycol | 1,040 parts |
| Trimethylolpropane | 67 parts |

REFERENTIAL EXAMPLE 2

Preparation of Polyester Resin (b)

The starting materials listed below were charged into a reaction vessel and subjected to an esterification reaction at 250° C. for 5 hours. After discharging a stoichiometric amount of water from the reaction system, 0.5 parts of antimony trioxide was added and the reaction was carried out at 270° C. for 4 hours under vacuum so as to prepare a polyester resin having a degree of polymerization of about 120. This highly polymerized polyester resin was depolymerized with 54 parts of trimethylolpropane to prepare a polyester resin (b) having a hydroxyl value of 33, a softening point of 125° C., an acid value of 1.6, and a number average molecular weight of 5,200.

This resin had an average of 0.15 carboxyl groups in one molecule.

| | |
|---|---|
| Terephthalic Acid | 1,494 parts |
| Adipic Acid | 146 parts |
| Ethylene Glycol | 497 parts |
| 1,4-Cyclohexanedimethanol | 721 parts |

REFERENTIAL EXAMPLE 3

Preparation of Polyester Resin (c)

The starting materials listed below were charged into a reaction vessel and treated as in Referential Example 2 to prepare a polyester resin having a degree of polymerization of about 120. This highly polymerized polyester resin was depolymerized with 37 parts of glycerin to prepare a polyester resin (c) having a hydroxyl value of 36, a softening point of 110° C., an acid value of 3 and a number average molecular weight of 4,700.

This resin had an average of 0.25 carboxyl groups in one molecule.

| Terephthalic Acid | 1,661 parts |
| Neopentyl Glycol | 834 parts |
| Ethylene Glycol | 372 parts |
| 1,6-Hexanediol | 236 parts |

REFERENTIAL EXAMPLE 4

Preparation of Polyester Resin (d)

Phthalic anhydride (592 parts) was added to polyester resin (a) and the mixture was subjected to reaction at 180° C. for 2 hours so as to prepare a polyester resin (d) having a hydroxyl value of 27, a softening point of 117° C., an acid value of 9, and a number average molecular weight of 4,800.

This resin had an average of 0.77 carboxyl groups in one molecule.

REFERENTIAL EXAMPLE 5

Preparation of Polyester Resin (e)

Phthalic anhydride (888 parts) was added to polyester resin (a) and the mixture was subjected to reaction at 180° C. for 2 hours so as to prepare a polyester resin (e) having a hydroxyl value of 23, a softening point of 119° C., an acid value of 13 and a number average molecular weight of 5,200.

This resin had an average of 1.20 carboxyl groups in one molecule.

REFERENTIAL EXAMPLE 6

Preparation of Acrylic Resin (a)

Xylene (3,000 parts) was charged into a reactor equipped with a stirrer and a reflux condenser. With heating under reflux, a mixture consisting of the monomers, polymerization initiator and chain transfer modifier listed below was added dropwise over a period of 4 hours. After being held under reflux for 1 hour, the reaction mixture was cooled and 5 parts of azoisobutyronitrile was added. The residual monomer was removed from the reaction system at 80° to 100° C. so as to complete the polymerization and the solvent was removed under vacuum, thereby obtaining an acrylic resin (a) having a hydroxyl value of 47, a softening point of 110° C. and a number average molecular weight of 4,700.

| Methyl Methacrylate | 400 parts |
| n-Butyl Methacrylate | 284 parts |
| Hydroxyethyl Methacrylate | 156 parts |
| Styrene | 291 parts |
| Azobisisobutyronitrile | 50 parts |
| n-Dodecylmercaptan | 2 parts |

REFERENTIAL EXAMPLE 7

Preparation of Acrylic Resin (b)

The monomers listed below were treated as in Referential Example 6 to prepare an acrylic resin (b) having a hydroxyl value of 77, a softening point of 105° C., a glycidyl equivalent of 5,800 and a number average molecular weight of 4,000.

This resin had an average of 0.7 glycidyl groups in one molecule.

| Methyl Methacrylate | 600 parts |
| n-Butyl Methacrylate | 312 parts |
| Hydroxypropyl Methacrylate | 230 parts |
| Glycidyl Methacrylate | 25 parts |

REFERENTIAL EXAMPLE 8

Preparation of Acrylic Resin (c)

The monomers listed below were treated as in Referential Example 6 to prepare an acrylic resin (c) having a hydroxyl value of 89, a softening point of 105° C., a glycidyl equivalent of 1,000 and a number average molecular weight of 5,300.

This resin had an average of 5.3 glycidyl groups in one molecule.

| Methyl Methacrylate | 400 parts |
| Hydroxypropyl Methacrylate | 260 parts |
| Styrene | 333 parts |
| Glycidyl Methacrylate | 142 parts |

REFERENTIAL EXAMPLES 9 TO 11

Preparation of Composition (A)

Polyester resin (b) and acrylic resin (b) were mixed in weight proportions of 70/30 (Referential Example 9), 50/50 (Referential Example 10) and 30/70 (Referential Example 11) and the respective mixtures were subjected to reaction at 170° C. for 1 hour so as to prepare compositions (a), (b) and (c). These compositions had respective glycidyl equivalents of 33,700, 14,700 and 9,500. The conversions of glycidyl groups were 42.6%, 20.9% and 13.3%, respectively.

REFERENTIAL EXAMPLE 12

Preparation of Composition (A)

Polyester resin (c) and acrylic resin (b) were mixed in weight proportions of 70/30 and the mixture was subjected to reaction at 150° C. for 30 minutes so as to prepare a composition (d). This composition had a glycidyl equivalent of 29,700. The conversion of glycidyl groups was 34.8%.

REFERENTIAL EXAMPLE 13

Preparation of Composition (A)

Polyester resin (d) was mixed with acrylic resin (b) in weight proportions of 70/30 and the mixture was subjected to reaction at 140° C. for 20 minutes so as to prepare a composition (e). This composition had a glycidyl equivalent of 149,000. The conversion of glycidyl groups was 87.0%.

REFERENTIAL EXAMPLE 14

Preparation of Composition (A)

Polyester resin (a) and acrylic resin (a) were mixed in weight proportions of 70/30 and the mixture was subjected to reaction at 180° C. for 1 hour so as to prepare a composition (f).

REFERENTIAL EXAMPLE 15

Preparation of Composition (A)

Polyester resin (e) and acrylic resin (c) were mixed in weight proportions of 70/30 and the mixture was subjected to reaction at 140° C. It turned into a gel in 20 minutes.

REFERENTIAL EXAMPLE 16

Preparation of Crystalline Aliphatic Polyester Resin

The starting materials shown below were charged into a reaction vessel and subjected to an esterification reaction at 230° C. After discharging a stoichiometric amount of water to the outside of the reaction system, 0.7 parts of tetrabutyl titanate was added and the mixture was subjected to reaction at 245° C. at a reduced pressure of 0.5 mm Hg, thereby producing a polyester resin having the same degree of polymerization as in Referential Example 3. Then, this polyester resin was depolymerized with 27 parts of trimethylolpropane to prepare a crystalline aliphatic polyester resin having a hydroxyl value of 20, an acid value of 2, a melting point of 87° C. and a number average molecular weight of 6,700.

| SL-20 | 1,710 parts |
| --- | --- |
| 1,4-Butanediol | 675 parts |

REFERENTIAL EXAMPLE 17

Preparation of Composition (C)

10 Parts of composition (a), 63 parts of polyester resin (a) and 27 parts of acrylic resin (b) were mixed (dry-blended at room temperature) to prepare a composition (g).

REFERENTIAL EXAMPLE 18

Preparation of Composition (C)

50 Parts of composition (c) was mixed with 50 parts of polyester resin (b) to prepare a composition (h).

REFERENTIAL EXAMPLE 19

Preparation of Composition (C)

50 Parts of composition (b) was mixed with 50 parts of acrylic resin (b) to prepare a composition (i).

REFERENTIAL EXAMPLE 20

Preparation Of Composition (D)

98 Parts of composition (g) and 2 parts of a crystalline long chain aliphatic diol (SL-20-OH, m.p. 87° C.) having a hydroxyl value of 357 were mixed to prepare a composition (j).

REFERENTIAL EXAMPLE 21

Preparation of Composition (D)

95 Parts of composition (a) and 5 parts of the aliphatic polyester prepared in Referential Example 16 were mixed to prepare a composition (k).

REFERENTIAL EXAMPLE 22

Preparation of Composition (D)

90 Parts of composition (a) and 10 parts of the aliphatic polyester prepared in Referential Example 16 were mixed to prepare a composition (l).

REFERENTIAL EXAMPLE 23

Preparation of Composition (D)

75 Parts of composition (a) and 25 parts of the aliphatic polyester prepared in Referential Example 16 were mixed to prepare a composition (m).

EXAMPLES 1 TO 5 AND COMPARATIVE EXAMPLES 1 TO 5

Composition (A), polyester resin and acrylic resin shown in Table 1, as well as a blocked polyisocyanate (Adduct B-1065; product of Hüls) were weighed in the proportions shown in Table 1 and mixed to prepare resin compositions.

To each of these resin compositions, 40 parts of titanium dioxide of futile type (JR 600E of Teikoku Kako K.K.) as a pigment and 1 part of polyacrylate ester base leveling agent (Acronal 4F of BASF A.G.) were added. The resulting mixtures were melt-kneaded with heated rolls at 120° C. for 3 minutes, cooled to solidify, and ground into particles. By classification, powder coatings with a particle size of not more than 105 μm were obtained.

These powder coatings were applied to zinc phosphate treated steel sheets having a thickness of 0.8 mm by electrostatic spraying to prepare coating film in a thickness of about 50 μm. The applied coatings were baked at 200° C. for 20 minutes.

The performance of each of the paint films thus formed is also shown in Table 1.

TABLE 1

| | Example | | | | | Comparative Example | | | | |
| --- | --- | --- | --- | --- | --- | --- | --- | --- | --- | --- |
| | 1 | 2 | 3 | 4 | 5 | 1 | 2 | 3 | 4 | 5 |
| Resin Composition | | | | | | | | | | |
| Composition (a) | 100 | | | | | | | | | |
| Composition (b) | | 100 | | | | | | | | |
| Composition (c) | | | 100 | | | | | | | |
| Composition (d) | | | | 100 | | | | | | |
| Composition (e) | | | | | 100 | | | | | |
| Composition (f) | | | | | | | | | 100 | |
| Polyester Resin (b) | | | | | | 100 | | 70 | | |
| Polyester Resin (e)* | | | | | | | | | | 70 |
| Acrylic Resin (b) | | | | | | | 100 | 30 | | |
| Acrylic Resin (c) | | | | | | | | | | 30 |
| Blocked Polyisocyanate | 20 | 27 | 32 | 23 | 24 | 18 | 24 | 20 | 20 | 22 |
| Performance of Paint Film | | | | | | | | | | |
| Smoothness | ○ | ○ | ○ | ○ | ○ | ○ | ○ | x | Δ | |
| Gloss (%) | 98 | 96 | 96 | 97 | 94 | 99 | 91 | 35 | 70 | 82 |
| Erichsen Distensibility (mm) | >7 | >7 | >7 | >7 | >7 | >7 | 3 | 6 | >7 | >7 |

TABLE 1-continued

|  | Example ||||| Comparative Example |||||
|---|---|---|---|---|---|---|---|---|---|---|
|  | 1 | 2 | 3 | 4 | 5 | 1 | 2 | 3 | 4 | 5 |
| Impact Resistance (cm) | 50 | 45 | 40 | 50 | 50 | 50 | 15 | 30 | 30 | 30 |
| Flexibility (bending at 3 mmφ) | o | o | o | o | o | o | x | x | x | x |
| Pencil Hardness | 2H | 2H | 2H | 2H | 2H | H | 2H | H | H | H |
| Stain Resistance | ⊚ | ⊚ | ⊚ | ⊚ | ⊚ | x | ⊚ | Δ | Δ |  |
| Weatherability (%) | 84 | 85 | 87 | 88 | 87 | 45 | 87 | — | 72 | 51 |

As is clear from Table 1, Examples 1 to 5 show the case of using polyester-acrylic hybrid compositions in which the carboxyl groups in the polyester resins and the glycidyl groups in the acrylic resins were present in appropriate amounts and which contained the copolymers prepared by reacting the two resins. These compositions were capable of forming ideal paint films which, in addition to high degrees of smoothness and gloss, possessed both the strength of the polyester resins and the hardness, stain resistance and weatherability of the acrylic resins.

Comparative Example 1 refers to the case of using a resin composition that was solely made of a polyester resin. It produced a strong paint film but the hardness, stain resistance and weatherability of this film were poor.

Comparative Example 2 refers to the case of using a resin composition that was solely made of an acrylic resin. The paint film it produced was high in hardness, stain resistance and weatherability but was low in strength.

Comparative Example 3 employed the same polyester and acrylic resin as those used in Example 1. However, in the absence of a copolymer produced by reacting the two resins, the resin composition prepared in this comparative example failed to provide a smooth paint film on account of the poor miscibility of the two resins. Furthermore, the paint produced did not exhibit any of the features of the two resins.

Comparative Example 4 shows the case where the content of carboxyl groups in the polyester resin and that of glycidyl groups in the acrylic resin were unduly small. On account of the smallness of the quantity of the copolymer produced by the reaction between the two resins, the paint produced was not highly smooth and did not exhibit any of the features of the two resins.

By contrast, Comparative Example 5 shows the case where the content of carboxyl groups in the polyester resin and that of glycidyl groups in the acrylic resin were excessive. A copolymer was produced in a large amount by reaction between the two resins and as a result, the composition became progressively high in molecular weight to impair the smoothness of a paint film. The paint film it produced was particularly low in stain resistance and weatherability, which are two major features of the acrylic resin.

The paint film obtained in Example 1 was sliced in a thickness of about 1 μm with a microtome by cutting it in a direction perpendicular to the coated surface. The cross section of the film was stained with osmic acid and examined under a TEM at a magnification of 10,000. A TEM photo of this cross section is reproduced in FIG. 1, which shows the formation of a film (presumably an acrylic film) about 0.5 μm thick at the surface of the paint film. It would be due to this film that the stain resistance comparable to that attainable by a paint film solely made of the acrylic resin, as well as the weatherability and pencil hardness close to those exhibited by said acrylic resin film are contributed to the paint film obtained in Example 1. The portion of the cross section below the surface layer has a sea-island structure in which the sea presumably made of the polyester resin is interspersed with islands which are presumably made of the acrylic resin. It would be this polyester resin layer that supports those levels of Erichsen distensibility, impact resistance and flexibility which are comparable to those attained by a paint film solely made of the polyester resin. The local presence of titanium dioxide (dark spots) in the sea layer would derive from its higher affinity for the polyester resin.

EXAMPLES 6 TO 8

Compositions (g), (h) and (i), and blocked polyisocyanate (Adduct B-1530) were weighed in the proportions shown in Table 2 and mixed to prepare resin compositions.

These resin compositions were formulated in powder coatings as in Examples 1 to 5, applied by an electrostatic coating technique and baked. The performance of the resulting paint films was evaluated and the results are shown in Table 2.

TABLE 2

|  | Example |||
|---|---|---|---|
|  | 6 | 7 | 8 |
| Resin Composition |  |  |  |
| Composition (g) | 100 |  |  |
| Composition (h) |  | 100 |  |
| Composition (i) |  |  | 100 |
| Blocked Polyisocyanate | 20 | 20 | 27 |
| Performance of Paint Film |  |  |  |
| Smoothness | o | o | o |
| Gloss (%) | 95 | 96 | 94 |
| Erichsen Distensibility (mm) | >7 | >7 | >7 |
| Impact Resistance (cm) | 50 | 50 | 30 |
| Flexibility (3 mm φ bend) | o | o | o |
| Pencil Hardness | 2H | 2H | 2H |
| Stain Resistance | ⊚ | ⊚ | ⊚ |
| Weatherability (%) | 86 | 80 | 90 |

Example 6 shows the case where composition (A), used as an agent that would increase the miscibility of polyester and acrylic resins, was capable of producing a paint film that possessed both the desired surface properties of the acrylic resin film and the high toughness of the polyester resin film. As shown in Example 7 (composition (A)+polyester resin) or in Example 8 (composition (A)+acrylic resin), composition (A) is miscible with the polyester or acrylic resin to bring about the features of either resin.

EXAMPLES 9 TO 11 AND COMPARATIVE EXAMPLE 6

Compositions (J), (h), (l) and (m), and blocked polyisocyanate were weighed in the proportions shown in Table 3 and mixed to prepare resin compositions.

These resin compositions were formulated in powder coatings as in Examples 1 to 5, applied by an electrostatic coating technique and baked. The performance of the resulting paint films was evaluated and the results are shown in Table 3.

TABLE 3

|  | Example 9 | Example 10 | Example 11 | Comparative Example 6 |
|---|---|---|---|---|
| Resin Composition |  |  |  |  |
| Composition (j) | 100 |  |  |  |
| Composition (k) |  | 100 |  |  |
| Composition (l) |  |  | 100 |  |
| Composition (m) |  |  |  | 100 |
| Blocked Polyisocyanate | 22 | 19 | 18 | 17 |
| Performance of Paint Film |  |  |  |  |
| Smoothness | ⊚ | ⊚ | ⊚ | — |
| Gloss (%) | 98 | 99 | 98 | — |
| Erichsen Distensibility (mm) | >9 | >9 | >9 | — |
| Impact Resistance (cm) | 60 | 75 | 60 | — |
| Flexibility (2 mm φ bend) | ○ | ○ | ○ | — |
| Pencil Hardness | 2H | H | 2H | — |
| Stain Resistance | ⊚ | ⊚ | ⊚ | — |
| Weatherability (%) | 87 | 86 | 85 | — |

As is clear from the results of Examples 9 to 11, powder coating resin compositions prepared from compositions (D) containing a crystalline aliphatic polyester or a crystalline long chain aliphatic diol are capable of producing paint films that are much higher in smoothness, impact resistance and flexibility.

The resin composition prepared in Comparative Example 6 was difficult to be ground into fine particles at room temperature and it was impossible to produce a paint film that could reasonably be subjected to performance evaluations.

In order to see whether the paint film prepared in Example 9 was flexible enough to withstand use under severer conditions, it was subjected to a bending test at a smaller diameter of curvature (1 mm φ). No detectable flaws occurred, which shows the excellent flexibility of the film.

While the invention has been described in detail and with reference to specific embodiments thereof, it will be apparent to one skilled in the art that various changes and modifications can be made therein without departing from the spirit and scope thereof.

What is claimed is:

1. A process for producing a resin composition for powder coatings, which comprises:
    (1) reacting a polyester resin (A1) with an acrylic resin (A2) to prepare a composition (A) containing a polyester resin (A1), an acrylic resin (A2) and a copolymer (CP) formed by said reaction, wherein said polyester resin (A1) has an average of 0.1 to 1.0 carboxyl groups in one molecule, a hydroxyl value of 10 to 100 and a softening point of 50° to 150° C., and said acrylic resin (A2) has an average of 0.1 to 4.0 glycidyl groups in one molecule, a hydroxyl value of 30 to 150 and a softening point of 50° to 150° C.; and
    (2) melt-kneading 5 to 50 parts by weight of a blocked isocyanate with 100 parts by weight of said composition (A).

2. A process for producing a resin composition for powder coatings according to claim 1, wherein the polyester resin (A1) has an average of 0.15 to 0.60 carboxyl groups in one molecule.

3. A process for producing a resin composition for powder coatings according to claim 1, wherein the acrylic resin (A2) has an average of 0.3 to 2.0 glycidyl groups in one molecule.

4. A process for producing a resin composition for powder coatings according to claim 1, wherein the polyester resin (A1) has a hydroxyl value of 20 to 50.

5. A process for producing a resin composition for powder coatings according to claim 1, wherein the acrylic resin (A2) has a hydroxyl value of 50 to 120.

6. A process for producing a resin composition for powder coatings according to claim 1, wherein the polyester resin (A1) has a softening point of 90° to 140° C.

7. A process for producing a resin composition for powder coatings according to claim 1, wherein the acrylic resin (A2) has a softening point of 90° to 140° C.

8. A process for producing a resin composition for powder coatings according to claim 1, wherein the ratio of the sum of the polyester resin (A1) and the polyester components of the copolymer (CP) to the sum of the acrylic resin (A2) and the acrylic components of the copolymer (CP) is in the range of from about 10/90 to 90/10 by weight.

9. A process for producing a resin composition for powder coatings according to claim 8, wherein the ratio of the sum of the polyester resin (A1) and the polyester components of the copolymer (CP) to the sum of the acrylic resin (A2) and the acrylic components of the copolymer (CP) is in the range of from 30/70 to 70/30 by weight.

10. A process for producing a resin composition for powder coatings according to claim 1, wherein the blocked polyisocyanate (B) is present in an amount of 10 to 30 parts by weight per 100 parts by weight of the composition (A).

11. A process for producing a resin composition for powder coatings according to claim 1, wherein the copolymer (CP) is present in an amount of 0.5 to 20.0 wt % of composition (A).

12. A process for producing a resin composition for powder coatings according to claim 1, wherein the copolymer (CP) is present in an amount of 2 to 10 wt % of composition (A).

13. A process for producing a resin composition for powder coatings according to claim 1, wherein the copolymer (CP) is a block copolymer.

* * * * *